US011136838B1

(12) United States Patent
Liess

(10) Patent No.: US 11,136,838 B1
(45) Date of Patent: Oct. 5, 2021

(54) LOAD CELL FOR A TONG ASSEMBLY

(71) Applicant: Weatherford Technology Holdings, LLC, Houston, TX (US)

(72) Inventor: Martin Liess, Seelze (DE)

(73) Assignee: Weatherford Technology Holdings, LLC, Houston, TX (US)

( * ) Notice: Subject to any disclaimer, the term of this patent is extended or adjusted under 35 U.S.C. 154(b) by 0 days.

(21) Appl. No.: 16/855,492

(22) Filed: Apr. 22, 2020

(51) Int. Cl.
*E21B 19/16* (2006.01)
*G01L 3/10* (2006.01)

(52) U.S. Cl.
CPC .......... *E21B 19/166* (2013.01); *E21B 19/161* (2013.01); *G01L 3/108* (2013.01)

(58) Field of Classification Search
CPC .... E21B 19/166; E21B 19/161; E21B 19/165; E21B 19/16; E21B 19/163; E21B 19/164; E21B 19/162
See application file for complete search history.

(56) References Cited

U.S. PATENT DOCUMENTS

| | | | | |
|---|---|---|---|---|
| 2,645,121 A | * | 7/1953 | Scott | E21B 47/007 73/862.474 |
| 3,602,866 A | * | 8/1971 | Saxl | G01L 5/10 338/5 |
| 4,253,696 A | * | 3/1981 | Bradley | B66C 1/485 294/103.2 |
| 4,488,611 A | * | 12/1984 | Jacobson | G01G 3/1412 177/211 |
| 4,567,779 A | * | 2/1986 | Byrne | E21B 19/166 173/176 |
| 4,649,777 A | | 3/1987 | Buck | |
| 4,738,145 A | | 4/1988 | Vincent et al. | |
| 4,957,002 A | * | 9/1990 | Coyle, Jr. | B23P 19/066 73/761 |
| RE33,526 E | | 1/1991 | Coyle, Sr. | |
| RE34,063 E | | 9/1992 | Vincent et al. | |
| 5,199,518 A | * | 4/1993 | Woodie | G01G 3/1402 177/211 |
| 5,245,265 A | | 9/1993 | Clay | |
| 5,245,877 A | * | 9/1993 | Ruark | E21B 19/166 73/726 |
| 5,259,275 A | * | 11/1993 | Schulze-Beckinghausen | E21B 19/164 81/57.16 |
| 5,509,316 A | * | 4/1996 | Hall | B25B 23/1425 73/862.23 |

(Continued)

FOREIGN PATENT DOCUMENTS

DE    10 2014 210 860 A1    12/2015
EP    2100115 A1    9/2009
(Continued)

OTHER PUBLICATIONS

International Search Report and Written Opinion in related application PCT/US2021/028231 dated Jun. 11, 2021.

*Primary Examiner* — Kipp C Wallace
(74) *Attorney, Agent, or Firm* — Patterson + Sheridan, LLP

(57) ABSTRACT

A load cell for use with a tong assembly includes a body; a chamber formed in the body; and a strain gauge disposed in the chamber. The load cell also includes a first eye for pivotal coupling to the tong assembly, and a second eye for pivotal coupling to the tong assembly. An optional biasing member is disposed around the second eye for biasing the body relative to the tong assembly.

20 Claims, 7 Drawing Sheets

(56) References Cited

U.S. PATENT DOCUMENTS

| | | |
|---|---|---|
| 5,542,318 A | 8/1996 | Wesch, Jr. |
| 5,845,549 A | 12/1998 | Bouligny |
| 6,082,224 A | 7/2000 | McDaniels et al. |
| 6,212,763 B1 | 4/2001 | Newman |
| 6,263,763 B1 | 7/2001 | Feigel, Jr. et al. |
| 6,538,576 B1 * | 3/2003 | Schultz .................. E21B 47/01 340/854.6 |
| 7,188,547 B1 | 3/2007 | West et al. |
| 7,861,619 B2 * | 1/2011 | Stensland ............. E21B 19/165 81/57.16 |
| 8,726,743 B2 | 5/2014 | Ruehmann et al. |
| 9,488,017 B2 | 11/2016 | Angelle et al. |
| 9,657,539 B2 | 5/2017 | Gupta et al. |
| 10,337,264 B2 | 7/2019 | Rothe et al. |
| 10,465,458 B2 | 11/2019 | Ruehmann et al. |
| 10,605,016 B2 | 3/2020 | Thiemann |
| 2004/0144547 A1 | 7/2004 | Koithan et al. |
| 2004/0195555 A1 | 10/2004 | Bangert et al. |
| 2007/0107912 A1 | 5/2007 | Boutwell et al. |
| 2009/0266539 A1 | 10/2009 | Ruark et al. |
| 2010/0132180 A1 | 6/2010 | Conquergood et al. |
| 2011/0030512 A1 | 2/2011 | Begnaud, Jr. |
| 2012/0323500 A1 | 12/2012 | Prefontaine |
| 2012/0330552 A1 | 12/2012 | Conquergood et al. |
| 2015/0101826 A1 | 4/2015 | Gupta et al. |
| 2017/0051568 A1 * | 2/2017 | Wern ...................... G01L 3/102 |
| 2017/0211344 A1 | 7/2017 | Aalderink et al. |
| 2018/0142524 A1 * | 5/2018 | Rothe .................. E21B 19/161 |
| 2018/0171729 A1 * | 6/2018 | Wood .................... E21B 19/161 |
| 2020/0392799 A1 * | 12/2020 | Lloyd .................... E21B 19/12 |

FOREIGN PATENT DOCUMENTS

| | | |
|---|---|---|
| WO | 2004079148 A2 | 9/2004 |
| WO | 2005/045177 A1 | 5/2005 |
| WO | 2016191067 A1 | 12/2016 |
| WO | 2017031441 A1 | 2/2017 |
| WO | 2020041336 A1 | 2/2020 |

* cited by examiner

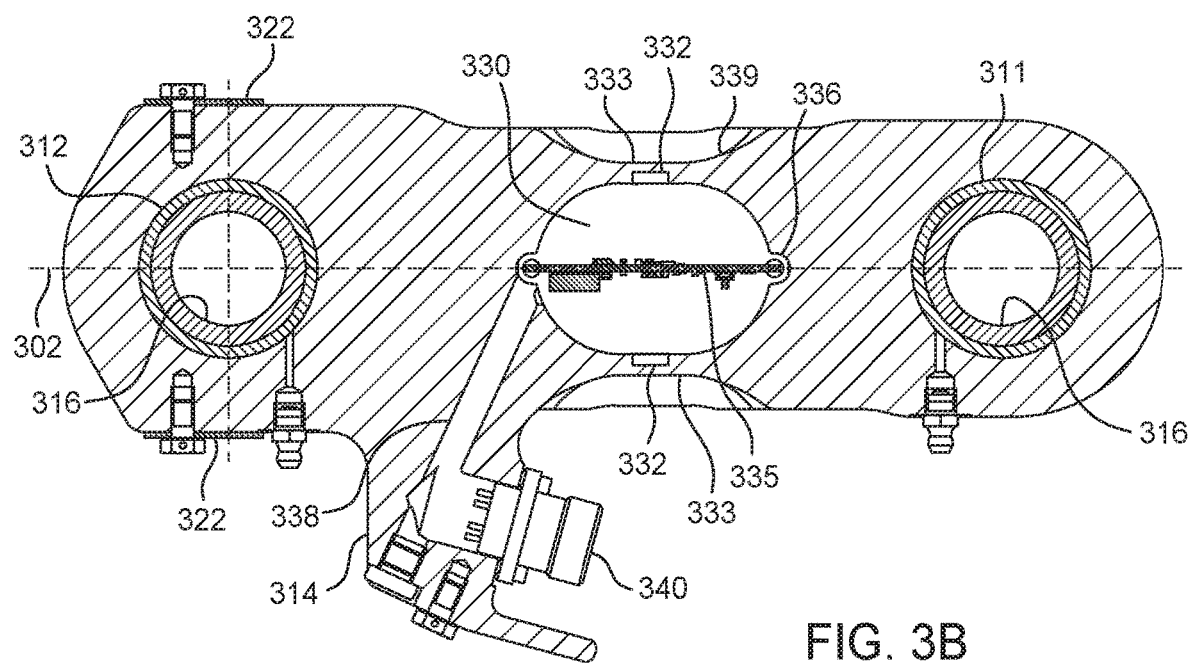
FIG. 3B
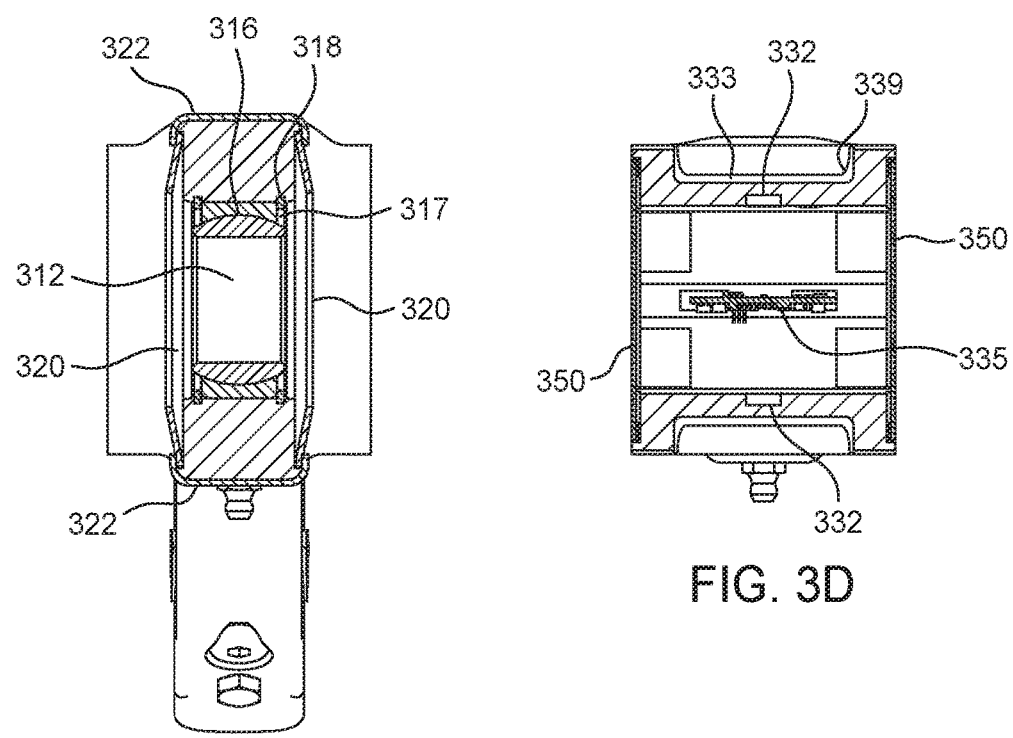
FIG. 3C
FIG. 3D

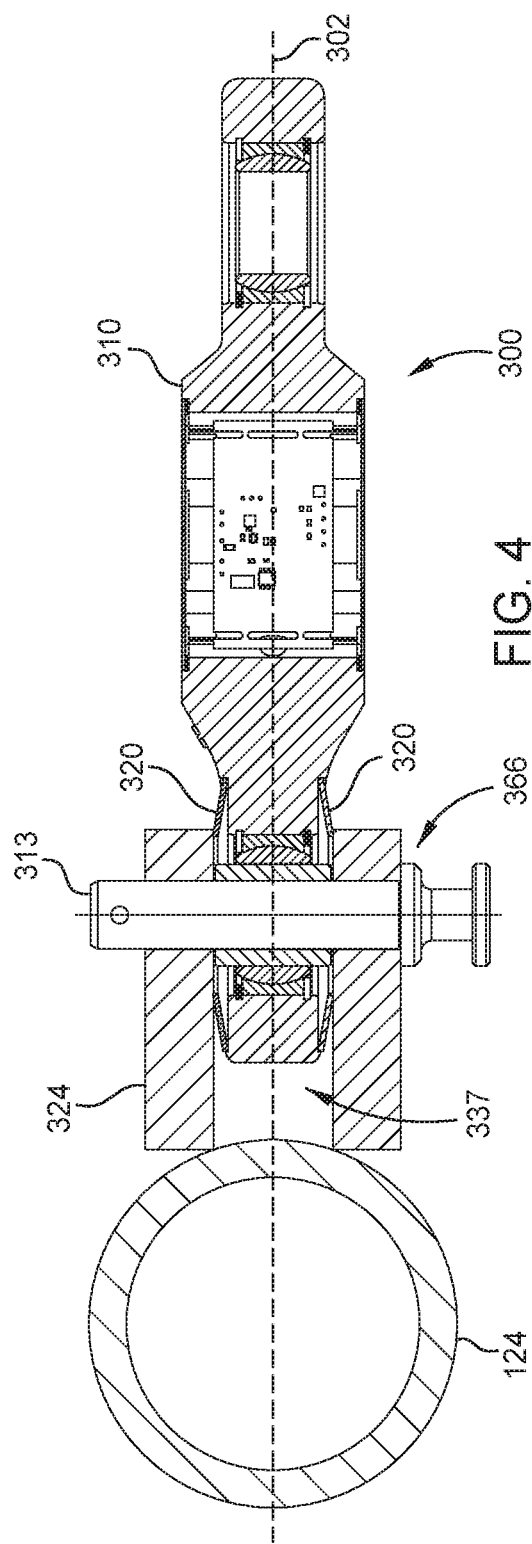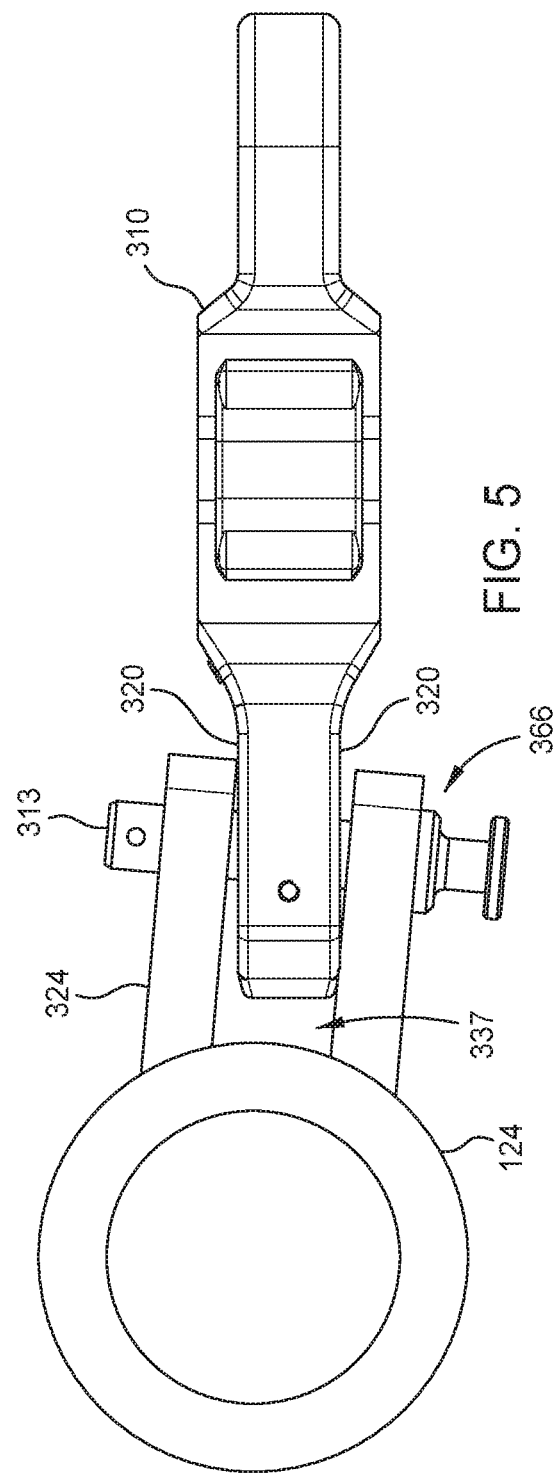

LOAD CELL FOR A TONG ASSEMBLY

BACKGROUND OF THE DISCLOSURE

Field of the Disclosure

The present disclosure generally relates to methods and apparatus for making up and breaking out tubular connections. More particularly, embodiments of the present disclosure relate to a load cell for a tong assembly for use in making up or breaking out tubular connections.

Description of the Related Art

Construction of oil or gas wells usually requires making long tubular strings that makeup casing, risers, drill pipe or other tubing. Due to the length of these strings, sections or stands of tubulars are progressively added to or removed from the tubular strings as they are lowered or raised from a drilling platform. A tong assembly is commonly used to makeup or breakout joints in the tubular strings.

It is desirable that the tong assembly applies a predetermined torque to the joint to prevent the joint from being too loose or too tight. Torque applied to the tubular has been monitored by measuring a force of compression or tension exerted on a component of a tong assembly and converting the measured force to torque. A tong assembly may be equipped with a load cell to measure the torque applied to a tubular connection.

The various conventional load cells are expensive to manufacture due to use of complex parts, considerable amount of machining, and difficulty in assembly.

Therefore, there is a need for an improved load cell for a tong assembly.

SUMMARY OF THE DISCLOSURE

In one embodiment, a load cell for use with a tong assembly includes a body; a chamber formed in the body; and a strain gauge disposed in the chamber. The load cell also includes a first eye for pivotal coupling to the tong assembly, and a second eye for pivotal coupling to the tong assembly. An optional biasing member is disposed around the second eye for biasing the body relative to the tong assembly.

In another embodiment, a tubular handling apparatus includes a power tong; a backup tong; and a load transfer assembly connected between the power tong and the backup tong. The load transfer assembly may include a load cell. In one embodiment, a load cell for use with a tong assembly includes a body; a chamber formed in the body; and a strain gauge disposed in the chamber. The load cell also includes a first eye for pivotal coupling to the tong assembly, and a second eye for pivotal coupling to the tong assembly. An optional biasing member is disposed around the second eye for biasing the body relative to the tong assembly.

A method of measuring a torque applied between a first tubular and a second tubular includes gripping the first tubular using a power tong; gripping the second tubular using a backup tong; applying a torque to the first tubular using a power tong; and measuring the torque using a load cell. The load cell may be bent relative to the backup tong while measuring the torque. The load cell may be returned into alignment with the backup tong using a biasing member.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 3B is a cross-sectional view of the load cell of FIG. 2.

FIG. 3C is a cross-sectional view of the second eye of the load cell of FIG. 2.

FIG. 3D is a cross-sectional view of the chamber of the load cell of FIG. 2.

FIG. 4 is a cross-sectional view of the load cell of FIG. 2 showing the load cell in alignment with the support leg of a tong assembly.

FIG. 5 is a top view of the load cell of FIG. 2 showing the load cell in a bent position relative to the support leg of a tong assembly

DETAILED DESCRIPTION

The present disclosure generally relates to a tong assembly for making up and breaking out a tubular connection such as a connection between two tubulars in a tubular string. The tubular strings may be made of tubulars that form risers, casings, drill pipes or other tubulars in oil and gas wells. Embodiment of the present disclosures relates to a tong assembly having a power tong, a backup tong and a load transfer assembly connected between the power tong and the backup tong. The load transfer assembly includes a torque bar and sensors, such as load cells, to monitor the torque exerted on the tubular string by the tong assembly.

Figure 1A:
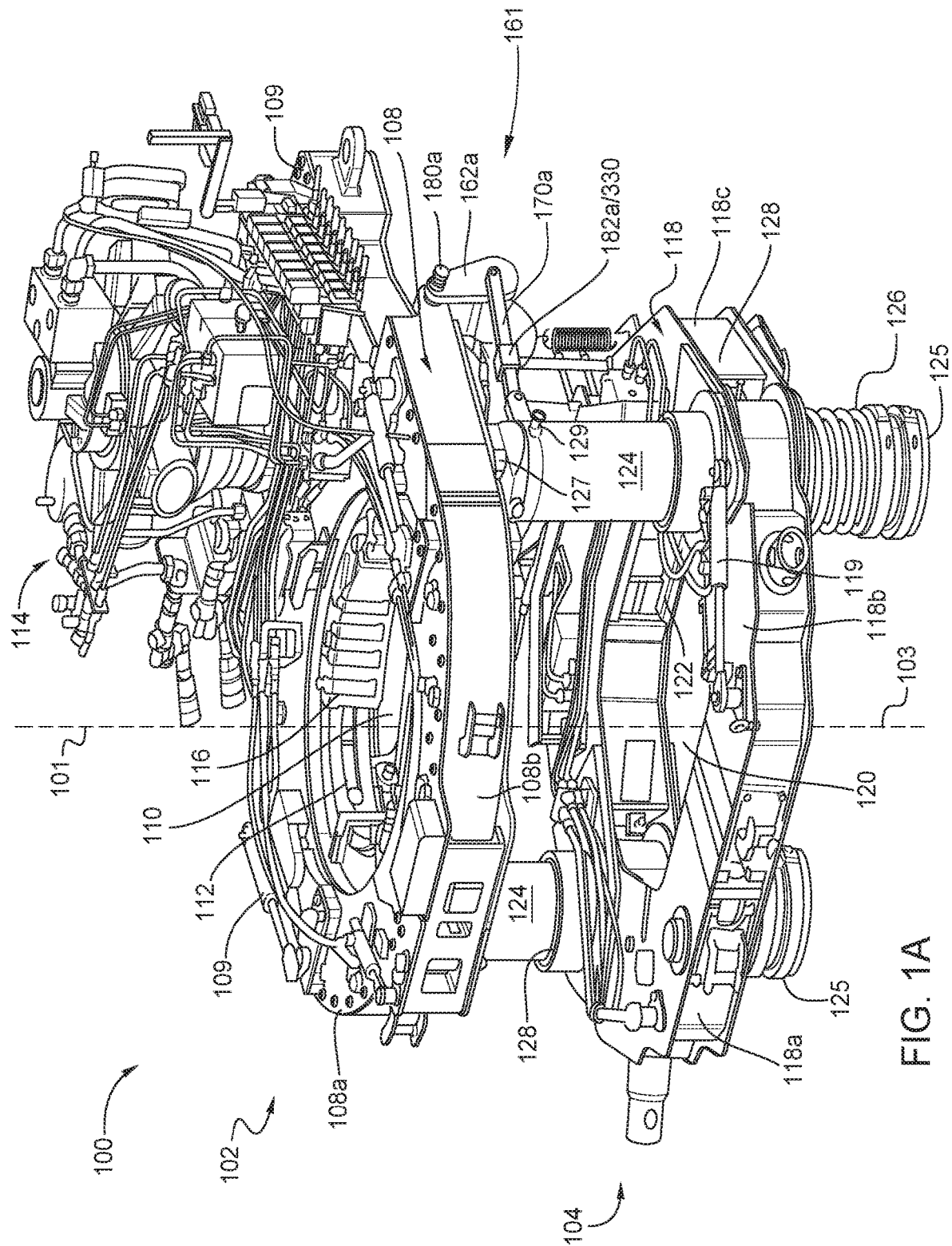
FIG. 1A is a perspective view of a tong assembly according to one embodiment of the present disclosure.
Figure 1B:
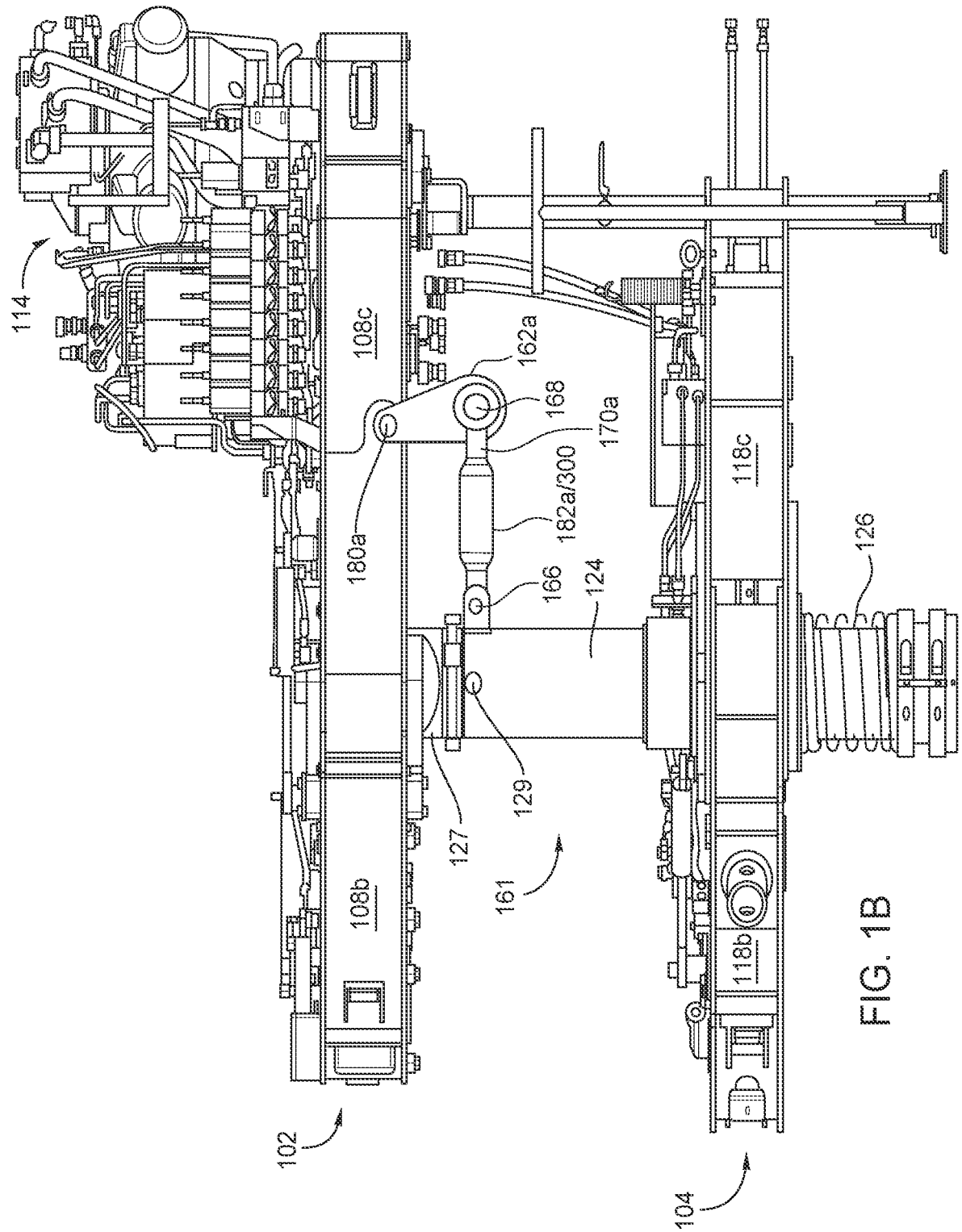
FIG. 1B is a side view of the tong assembly of FIG. 1A.

FIG. 1A illustrates an embodiment of a tong assembly 100 according to one embodiment of the present disclosure. FIG. 1B is a schematic side view of the tong assembly 100. The tong assembly 100 includes a power tong 102 and a backup tong 104. In operation, the power tong 102 may be suspended from a handling tool or supported by a stand. The power tong 102 and the backup tong 104 may be connected by a load transfer assembly 161.

The power tong 102 may include a frame 108 with a central opening 110 for receiving a tubular. The frame 108 may include two or more sections movable relative to each other to open and close the central opening 110. In one embodiment, the frame 108 may include two front sections 108a, 108b and one back section 108c. The front sections 108a, 108b are connected to the back section 108c by hinges and pivotable about the back section 108c. In one embodiment, the front sections 108a, 108b may be pivoted by pistons 109.

The power tong 102 may further include a rotor 112 disposed in the frame 108. The rotor 112 may be a segmented rotor. The rotor 112 may be coupled to a motor assembly 114. Jaws 116 may be attached to an inner diameter of the rotor 112. The jaws 116 may rotate with the rotor 112 to rotate a tubular about a central axis 101 during makeup and breakout of a tubular connection. The jaws 116 may move radially relative to the frame 108 to secure and release a tubular or to accommodate tubulars of various diameters. In one embodiment, the jaws 116 may be driven using a hydraulic circuit.

The backup tong 104 may be disposed underneath the power tong 102. The backup tong 104 may include a frame 118 with a central opening 120 for receiving a tubular. The frame 118 may include two or more sections movable relative to each other to open and close the central opening 120. In one embodiment, the frame 118 may include two front sections 118a, 118b and one back section 118c. The front sections 118a, 118b are connected to the back section 118c by hinges and pivotable about the back section 118c. In one embodiment, the front sections 118a, 118b may be pivoted by pistons 119. The backup tong 104 may include jaws 122 attached to the frame 118. The jaws 122 may move radially relative to the frame 118 to secure and release a tubular or to accommodate tubular of various diameters. In one embodiment, the jaws 122 may be driven using a hydraulic circuit.

The frame 118 of the backup tong 104 may be movably coupled to support legs 124. Lower ends 125 of the support legs 124 are configured to stand a platform or other stationary planes. The support legs 124 support the backup tong 104 and prevent the backup tong 104 from rotating during operation. In one embodiment, the frame 118 has through openings for receiving the support legs 124 therein. In one embodiment, the frame 118 may include sleeves 128 for receiving the support legs 124. In one embodiment, the frame 118 may be coupled to two support legs 124 that are symmetrically positioned about a central axis 103 of the backup tong 104. In one embodiment, the central axis 103 and central axis of the two support legs 124 may be within the same plane. Each support leg 124 may include a spring member 126 disposed at lower ends 125. Weight and vertical load of the backup tong 104 may rest on the spring members 126. The spring members 126 allow the backup tong 104 to be movable along the support legs 124 thus providing structure flexibility.

Figure 1C:
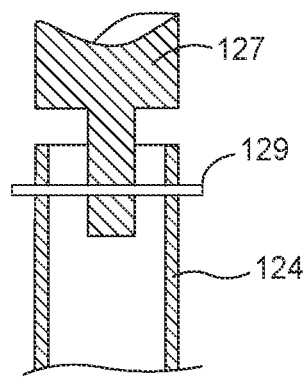
FIG. 1C is a schematic partial sectional view of a support leg of the tong assembly of FIG. 1A.

In one embodiment, the power tong 102 may include alignment posts 127 extending from a lower side of the frame 108. When the tong assembly 100 is assembled, the alignment posts 127 may be inserted into the support legs 124 so that the central axis 101 of the power tong 102 and the central axis 103 of the backup tong 104 may be substantially aligned (see FIG. 1C). The inner diameter of the support legs 124 is substantially larger than the outer diameter of the alignment posts 127 so that the power tong 102 may move relative to the backup tong 104 within a limited range without the alignment posts 127 contacting the support legs 124. When the alignment posts 127 do not contact the support legs 124, torsion and force are not transmitted between the support legs 124 and the alignment posts 127. In one embodiment, during assembly or transportation, pins 129 may be used to couple the alignment posts 127 to the support leg 124. However, during operation, the pins 129 are removed to allow relative movements between the power tong 102 and the backup tong 104 and avoid transmission of load between the alignment posts 127 and the support legs 124.

Figure 1D:
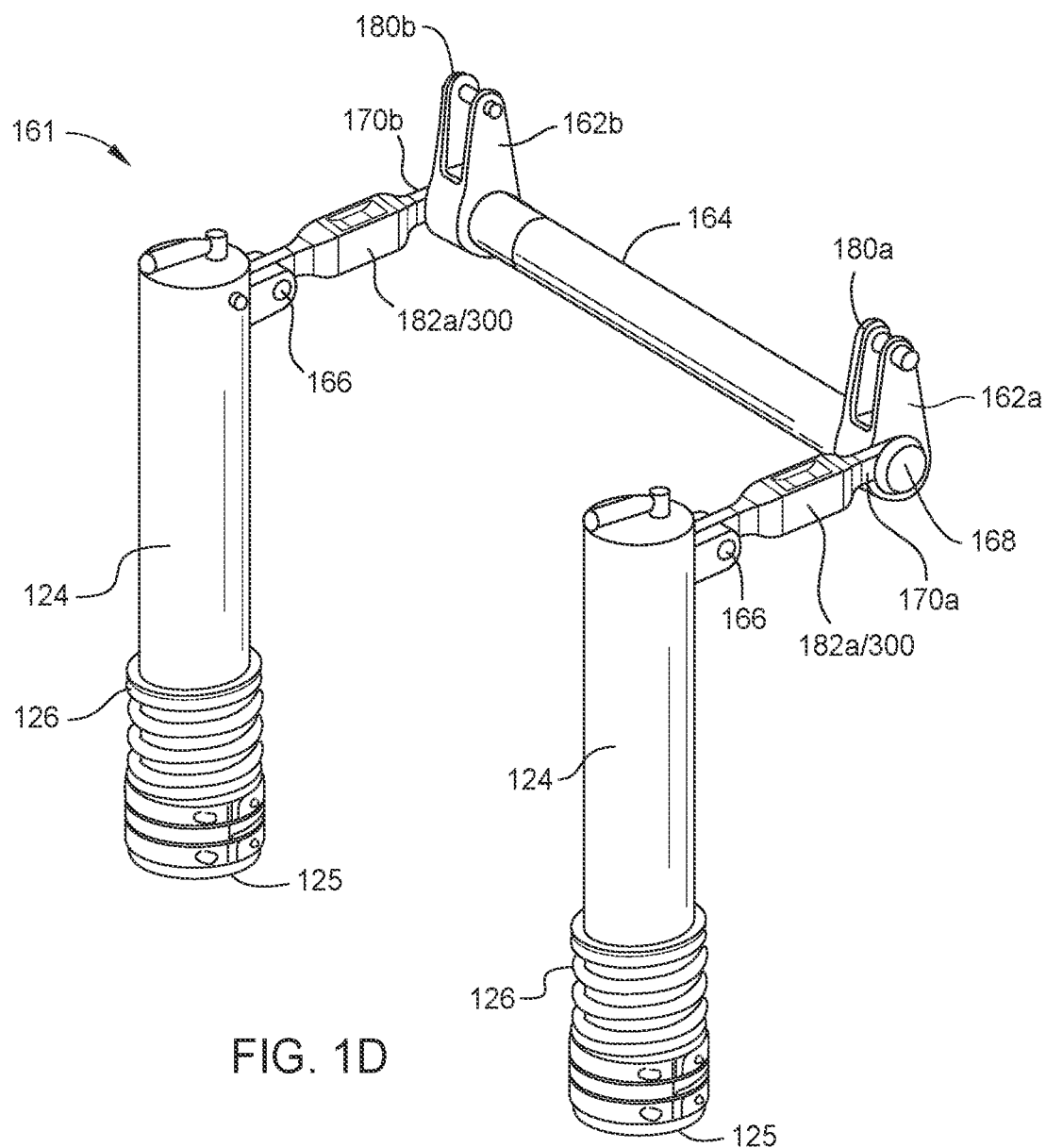
FIG. 1D schematically illustrates a load transfer assembly of the tong assembly of FIG. 1A.

The power tong 102 and the backup tong 104 are connected through the load transfer assembly 161. The load transfer assembly 161 may include two arms 162a, 162b, two links 170a, 170b, and a torque bar 164, as illustrated in FIG. 1D. The two arms 162a, 162b are coupled to the sides of the power tong 102 and extend downward from the power tong 102. The arms 162a, 162b may be pivotally coupled to the power tong 102 by pivot connections 180a, 180b, respectively. The pivot connections 180a, 180b may be located equidistant from the central axis 101. The torque bar 164 is connected to the two arms 162a, 162b. The links 170a, 170b are coupled between the support legs 124 and the arms 162a, 162b. Each link 170a, 170b is coupled to the corresponding support leg 124 by a pivot connection 166. Each link 170a, 170b is coupled to the corresponding arm 162a, 162b by a pivot connection 168.

When power tong 102 applies a torque to rotate a first tubular causing a joint between the first tubular and a second tubular held by the backup tong 104 to tighten or loosen, the load transfer assembly 161, coupled to the power tong 102 and the backup tong 104, provides reaction torques to prevent the power tong 102 from moving relative to the backup tong 104 along a horizontal plane. For example, during makeup, the torque applied by the power tong 102 creates a reaction force which, because of the torque bar 164 and the arms 162a, 162b, results in substantially equal and opposite movements being applied to the backup tong 104 via the links 170a, 170b.

Referring to FIG. 1D, according to various embodiments of the present disclosure, each arm 162a, 162b is coupled to a load cell 182a, 182b configured to measure the torque applied to the tubular connection. In one embodiment, the load cells 182a, 182b are integrated in the respective arm 162a, 162b. In another embodiment, the load cells 182a, 182b are attached to the respective arm 162a, 162b. The load cells 182a, 182b may be configured to measure data related to the force applied to a connection during makeup or breakout. In one embodiment, the load cell 182a, 182b is an electronic load cell. The load cell 182a, 182b may be configured to measure the applied force in tension or compression. In one embodiment, the first load cell 182a is configured to measure the applied force in tension during makeup, while the second load cell 182b is configured to measure the applied force in compression during makeup. During breakout, the second load cell 182b is configured to measure the applied force in tension, while the first load cell 182a is configured to measure the applied force in compression. It is contemplated the tong assembly 100 may include a single load cell, such as load cell 182a or load cell 182b.

Figure 2:
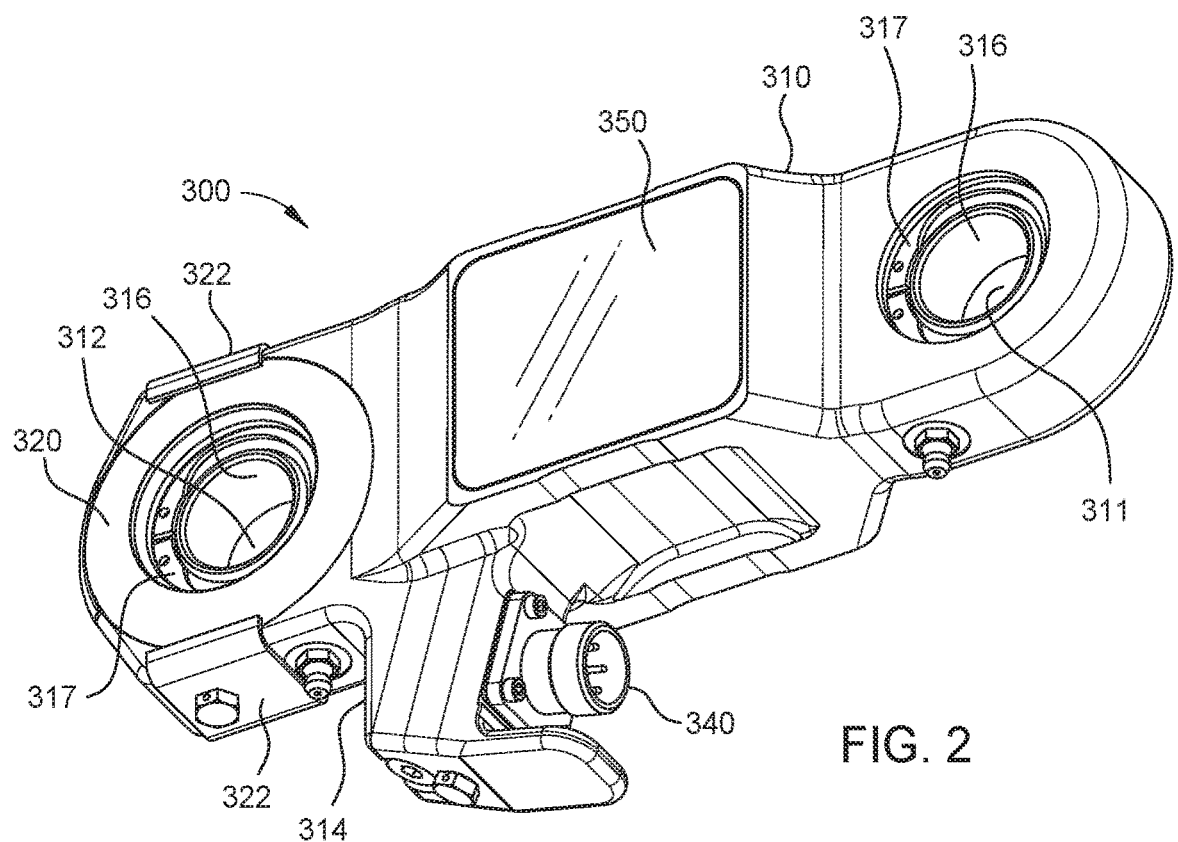
FIG. 2 is a perspective view of an exemplary embodiment of a load cell.
Figure 3A:
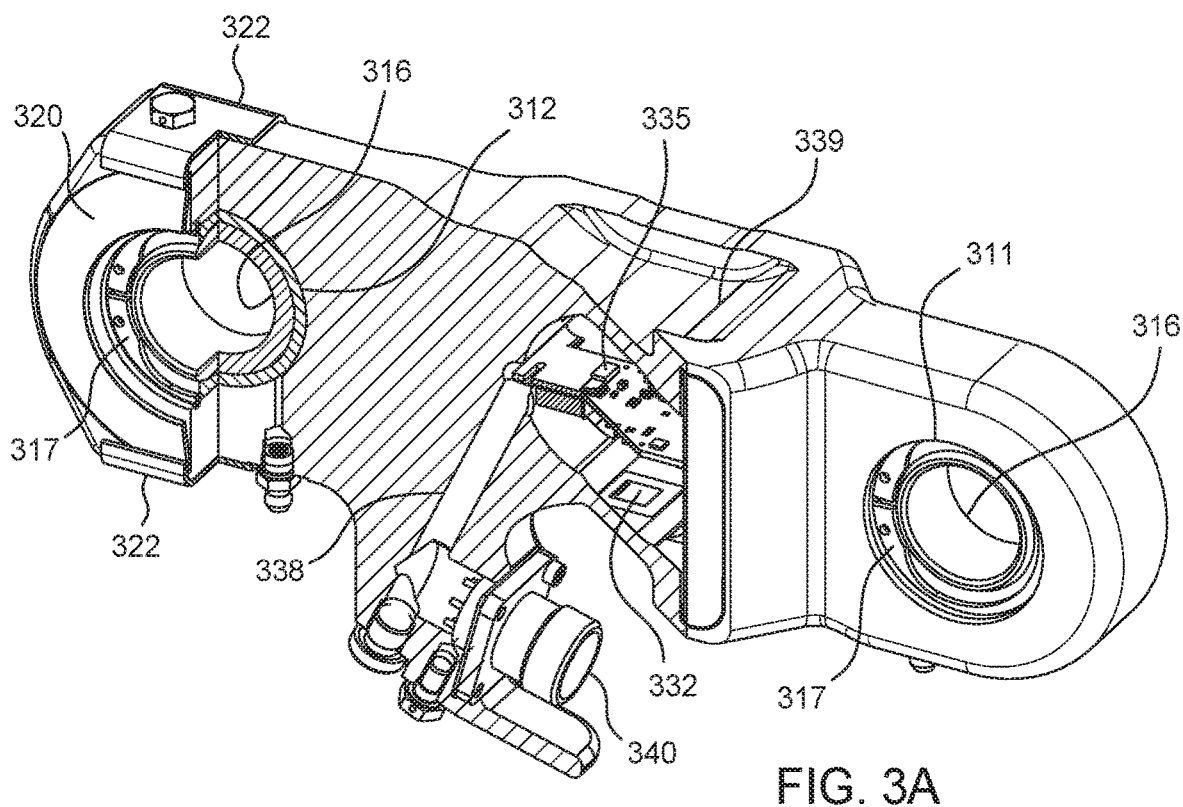
FIG. 3A is partial cross-sectional view of the load cell of FIG. 2.

FIG. 2 is a perspective view of an exemplary embodiment of a load cell 300. The load cell 300 is suitable for use as one or both of the load cells 182a, 182b of the tong assembly 100. FIG. 3A is partial cross-sectional view of the load cell 300, and FIG. 3B is a cross-sectional view of the load cell 300 shown along a longitudinal plane. In FIG. 3B, the longitudinal plane extends through a longitudinal axis 302 that passes through the centers of eyes 311, 312 within body 310. In one embodiment, the longitudinal axis 302 describes the direction along which a tension or compression force may act or may primarily act when load cell 300 is operating. The load cell 300 includes a body 310 having two eyes 311, 312 for coupling to the tong assembly 100. FIG. 3C is a cross-sectional view of the second eye 312 along a transverse plane relative to body axis 302. The body 310 may be manufactured by initially forming a cast body and then machining the body to refine it. A bearing 316 may be disposed in the first and second eyes 311, 312. A bearing retainer 317 may be disposed in a groove 318 on each side of the bearing 316 to keep the bearing 316 in position. In some embodiments, bearings 316 may define a ball joint having an inner race that can pivot in multiple directions relative to an outer race at body 310. A biasing member 320 is disposed around the second eye 312 on each side of the body 310. An exemplary biasing member 320 is a cup spring. In some embodiments, the biasing member 320 extends beyond an outer surface of the body 310. In one example, the biasing member 320 includes a hole in alignment with the second eye 312 for receiving the connector 313. Two spring retainers 322 are used to retain the biasing members 320 in position, although other suitable devices for retaining the biasing members 320 are contemplated. The spring retainers 322 may be attached to the body 310 using a screw, bolt, or other suitable attachment devices.

Referring to FIG. 1D and FIG. 4, when assembled in the load transfer assembly 161, the first eye 311 is pivotally connected to the torsion bar 164, and the second eye 312 is pivotally connected to a bracket 324 (shown in FIG. 4) of the support leg 124. A connector 313, such as a pin or bolt, may be inserted through bracket 324 and the second eye 312 of the body 310 to form the pivot connection 366. In some embodiments, the bracket 324 has two flanges, and the second eye 312 is disposed between the flanges. A gap 337 may be disposed between one or both brackets 324 and load cell body 310, or between one or both brackets 324 and one or both biasing members 320. In some embodiments, one or both biasing members 320 extend beyond the body 310 and contact a bracket 324. In some embodiments, one or both biasing members 320 contact a bracket 324 and may be slightly compressed by a bracket 324 while load transfer assembly 161 is in a resting configuration.

Referring again to FIG. 3B, the body 310 includes a chamber 330 for receiving the one or more electronic components, such as a strain gauge 332, an electrical board 335, connection wires or cables, and other suitable electronic components for measuring and communicating the measured strain. The chamber 330 is disposed between the first eye 311 and the second eye 312. In the example as shown, the chamber 330 is an aperture formed through the body 310. In this respect, the upper and lower walls of the chamber 330 define upper and lower thin wall sections 333 in the body 310. The thin wall sections 333 are disposed between the first eye 311 and the second eye 312. Thin wall section 333 extends lengthwise generally in the direction of the body axis 302, extending towards eyes 311, 312. The thin wall sections 333 may be configured as upper and lower tension beams during measurements of strain. FIG. 3D is a cross-sectional view of the chamber 330 along a transverse plane, relative to body axis 302. In one example, a recess 339 may be formed on the outer surface of the body to further reduce the thickness of the thin wall section 333. In some embodiments, the thin wall sections 333 may define the smallest cross-sectional area in the transverse plane of the body 320. In some embodiments, the cross-sectional area of the body 310 that includes the thin wall sections 333 is less than the cross-sectional area of the body 310 in other planes that are perpendicular to body axis 302 but not passing through chamber 330.

In one embodiment, the load cell 300 includes a plurality of strain gauges; for example, two strain gauges 332. In one example, one strain gauge 332 is disposed on the inner surface of the body 310 below the electrical board 335, and the other strain gauge 332 is disposed on the inner surface of the body 310 above the electrical board 335. In this example, the strain gauges 332 are disposed on the inner surface of the thin wall section 333. In some embodiments, the strain gauges 332 are disposed in a recess of the inner surface of the body 310. The strain gauges 332 are configured to measure a tension force or a compression force exert on load cell 300. In turn, the measured force may be used to calculate the applied torque. The electrical board 335 may extend across the chamber 330 and be disposed in a groove 336 formed in the inner surface of the body 310 and oriented along the longitudinal axis 302. In one example, the electrical board 335 includes amplifying electronic components.

A channel 338 is formed in the body 310 for wired communication, such as via cable, between the electrical board 335 and a plug 340. The plug 340 is disposed at a flange portion 314 of the body 310. In various embodiments, the flange portion 315 may also be described as a boss or a protrusion extending from the main portion of body 310. In some embodiments, the flange portion 314 is offset from the portion of the thin wall sections 333 that hold strain gauges 332, so as not to influence the strain gauges 332 during strain event. The plug 340 facilitates connection between the load cell 300 with another electrical device. The wired communication may include data, power, or both. A metal plate 350 is used as a cover to enclose the chamber on each side of the body 310. The metal plates 350 may be attached to the body 310 using an airtight seal. In some embodiments, a metal plate 350 is glued to each side of the body 310. In one example, the metal plates 350 are elastically glued to the body to reduce the influence on the measurement. Optionally, silicone or another suitable filling material may be provided in the chamber 330 to displace or to prevent an intrusion of air or other fluids. In one embodiment, air tightness can be checked by supplying pressurized air through the channel 338. In some embodiment, the metal plates 350 are attached to the body 310 independently from other components attached or disposed in the chamber 330, including but not limited to the strain gauges 332, the electrical board 335, and the electrical connection such as cable. As a result, components such as the strain gauges 332, the electrical board 335, and the electrical connections can be installed independently of the cover plates 350. In another embodiment, the body 310 may include over-sized holes to receive fasteners to allow the plates 350 to move relative to the fasteners and the body 310. A seal element may be used seal between each plate and the chamber, making the fastener junction fluid-tight.

As introduced earlier, FIG. 4 shows the load cell 300 in alignment with the support leg 124 when in a resting configuration, e.g., before rotation of a tubular that is being made-up or broken-out. In this aligned position, the body axis 302 of load cell 300 extends through or nearly through the center or the central region of support leg 124. Thus, when aligned, the load cell 300 may be perpendicular to the support leg 124 in the cross-sectional view of FIG. 4. The biasing members 320, such as cup springs, are used to align the support leg 124 with the load cell 300 before, during, or after operation. The alignment is maintained during the initial rotations of the tubular when the torque is low. At higher torques, the friction at the backup tong 104 locks the support legs 124 against rotation about its vertical axis. Referring to FIG. 5, the load cell 300 is allowed to rotate relative to the support leg 124 at the pivot connection 366 that includes the second eye 312. When compressed as shown, the springs 320 create a slight, acceptable bending at the load cell 300. When the torque is lowered, the springs 320 will return the support leg 124 into alignment with the load cell 300, as shown in FIG. 4.

Figure 6:
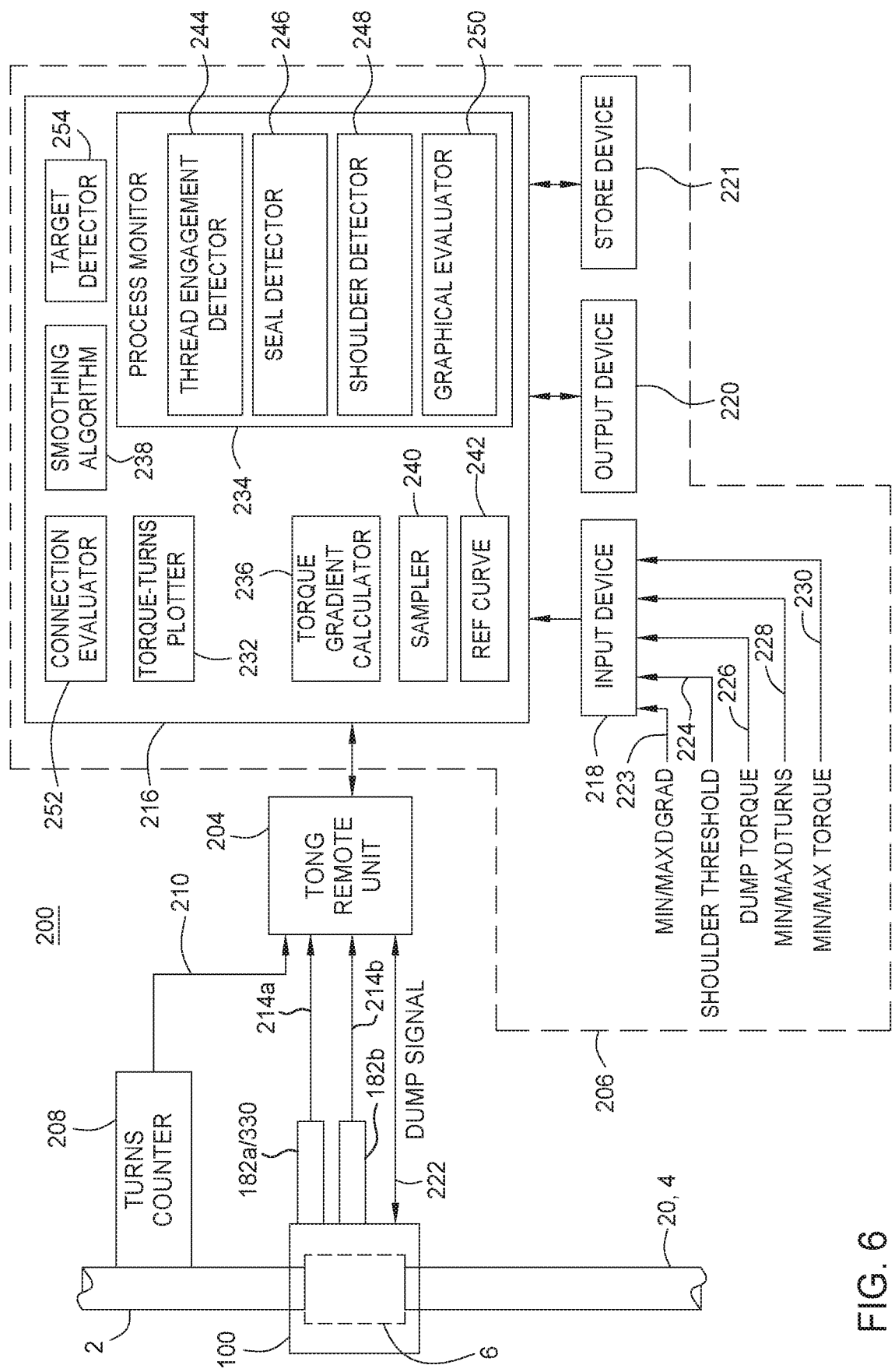
FIG. 6 is a block diagram illustrating a tubular makeup system according to embodiments disclosed herein.

FIG. 6 is a block diagram illustrating a tubular makeup system 200, according to one embodiment of the present disclosure. The tubular makeup system 200 may include the tong assembly 100, a tong remote unit (TRU) 204, a turns counter 208, load cell 182a (such as load cell 300), and the control system 206. The control system 206 may communicate with the TRU 204 via an interface. Depending on sophistication of the TRU 204, the interface may be analog or digital. Alternatively, the control system 206 may also serve as the TRU.

A programmable logic controller (PLC) 216 of the control system 206 may monitor the turns count signals 210 and torque signals 214a, 214b from the respective sensors 208, 182a, 182b and compare the measured values of these signals with predetermined values 223-230. In aspects, the PLC 216 may be any type of embedded computer device, for example, the PLC 216 may be replaced by a microcontroller unit (MCU), field programmable gate array (FPGA), application specific integrated circuit (ASIC), application specific instruction set processor (ASIP), digital signal processor (DSP), etc. The predetermined values 223-230 may be input by an technician for a particular connection. The predetermined values 223-230 may be input to the PLC 216 via an input device 218, such as a keypad or any touch sensitive display.

Illustrative predetermined values 223-230 which may be input, by a technician or otherwise, include minimum and maximum delta gradient values 223, a shoulder threshold gradient 224, a dump torque value 226, minimum and maximum delta turns values 228, minimum and maximum torque values 230, and reference curve data 242. During makeup of the connection 1, various output may be observed by an technician on an output device, such as a video monitor, which may be one of a plurality of output devices 220. The plurality of output devices 220 may also include a printer, a plotter, an alarm, or other audio equipment.

Upon the occurrence of a predefined event(s), the PLC 216 may output a dump signal 222 to the TRU 204 to automatically shut down or reduce the torque exerted by the tong assembly 100. For example, dump signal 222 may be issued in response to the measured torque value reaching the dump torque 226 and/or a bad connection.

The comparison of measured turn count values and torque values with respect to predetermined values is performed by one or more functional units of the PLC 216. The functional units may generally be implemented as hardware, software or a combination thereof. The functional units may include one or more of a torque-turns plotter algorithm 232, a process monitor 234, a torque gradient calculator 236, a smoothing algorithm 238, a sampler 240, a database 242 of reference curves, a connection evaluator 252, and a target detector 254. The process monitor 234 may include one or more of a thread engagement detection algorithm 244, a seal detection algorithm 246, a shoulder detection algorithm 248, and a graphical evaluator algorithm 250. Alternatively, the functional units may be performed by a single unit. As such, the functional units may be considered logical representations, rather than well-defined and individually distinguishable components of software or hardware.

In operation, one of the threaded members (e.g., tubular 2 and coupling 6) is rotated by the power tong 102 while the other tubular 4 is held by the backup tong 104. The applied torque and rotation are measured at regular intervals throughout the makeup. The load cell 330 will measure the tension force acting on the load cell 330. For example, if it is a makeup process, the load cell 330 will experience a tension force since the makeup torque is applied clockwise. In turn, the measured force may be used to calculate the applied torque by the control system 206 or TRU 204.

The frequency with which torque and rotation are measured may be specified by the sampler 240. The sampler 240 may be configurable, so that a technician may input a desired sampling frequency. The torque and rotation values may be stored as a paired set in a buffer area of memory. Further, the rate of change of torque with respect to rotation (hereinafter "torque gradient") may be calculated for each paired set of measurements by the torque gradient calculator 236. The smoothing algorithm 238 may operate to smooth a torque-turns curve and/or a torque gradient curve (e.g., by way of a running average). These values (torque, rotation, and torque gradient) may then be plotted by the plotter 232 for display on the output device 220.

The values (torque, rotation, and torque gradient) may then be compared by the connection evaluator 252, either continuously or at selected events, with predetermined values, such as the values 223-230. Based on the comparison of the measured and/or calculated values with the predefined values 223-230, the process monitor 234 may determine the occurrence of various events and the connection evaluator 252 may determine whether to continue rotation or abort the makeup. The thread engagement detection algorithm 244 may monitor for thread engagement of the tubulars 2, 4. Upon detection of thread engagement a first marker is stored. The marker may be quantified, for example, by time, rotation, torque, the torque gradient, or a combination of any such quantifications. During continued rotation, the seal detection algorithm 246 monitors for the seal condition. This may be accomplished by comparing the calculated torque gradient with a predetermined threshold seal condition value. A second marker indicating the seal condition may be stored if/when the seal condition is detected. At this point, the torque value at the seal condition may be evaluated by the connection evaluator 252.

For example, a determination may be made as to whether the turns value and/or torque value are within specified limits. The specified limits may be predetermined, or based on a value measured during makeup. If the connection evaluator 252 determines a bad connection, rotation may be terminated. Otherwise, rotation continues and the shoulder detection algorithm 248 monitors for the shoulder position. This may be accomplished by comparing the calculated torque gradient with the shoulder threshold gradient 224. When the shoulder position is detected, a third marker indicating the shoulder position is stored. The connection evaluator 252 may then determine whether the torque value at the shoulder position is acceptable by comparing to the respective input torque values 230.

Alternatively, a delta turns value may be entered instead of the dump torque 226. The target detector 254 may then calculate a target turns value using the shoulder turns and the delta turns value (target turns equals shoulder turns plus delta turns).

In one embodiment, a load cell for use with a tong assembly includes a body; a chamber formed in the body; a strain gauge disposed in the chamber; a first eye for pivotal coupling to the tong assembly; and a second eye for pivotal coupling to the tong assembly.

In another embodiment, a tubular handling apparatus includes a power tong; a backup tong; and a load transfer assembly connected between the power tong and the backup tong, wherein the load transfer assembly includes a load cell. In one embodiment, the load cell includes a body; a chamber formed in the body; a strain gauge disposed in the chamber; a first eye for pivotal coupling to power tong; a second eye for pivotal coupling to backup tong; and optionally, a biasing member disposed around the second eye for biasing the body relative to the backup tong.

In another embodiment, a method of measuring a torque applied between a first tubular and a second tubular includes gripping the first tubular using a power tong; gripping the second tubular using a backup tong; applying a torque to the first tubular using a power tong; measuring the torque using a load cell; bending the load cell relative to the backup tong while measuring the torque; and returning the load cell into alignment with the backup tong using a biasing member.

In one or more embodiments described herein, the load cell includes a biasing member disposed around the second eye for biasing the body relative to the tong assembly.

In one or more embodiments described herein, the biasing member includes a hole in alignment with the second eye.

In one or more embodiments described herein, the biasing member extends beyond the body.

In one or more embodiments described herein, the strain gauge is disposed on a thin wall section of the body.

In one or more embodiments described herein, the thin wall section of the body defines a portion of the chamber and is disposed between the first eye and the second eye.

In one or more embodiments described herein, the load cell includes an external plug for data communication with the strain gauge.

In one or more embodiments described herein, the load cell includes a channel formed in the body, the channel extending between the chamber and the plug.

In one or more embodiments described herein, the load cell includes an electrical board disposed in the chamber and in communication with the strain gauge.

In one or more embodiments described herein, the electrical board is disposed in the chamber along a longitudinal axis of the body.

In one or more embodiments described herein, a plurality of strain gauges are disposed in the chamber.

In one or more embodiments described herein, an electrical board is positioned between two strain gauges.

In one or more embodiments described herein, the load cell includes a bearing disposed in the second eye.

In one or more embodiments described herein, the load cell includes a bearing retainer for retaining the bearing in the second eye.

In one or more embodiments described herein, the load cell includes a plate for enclosing the chamber.

In one or more embodiments described herein, the plate is sealingly and elastically mounted to the body In one or more embodiments described herein, the plate is glued to the body.

In one or more embodiments described herein, a silicone is disposed in the chamber.

In one or more embodiments described herein, the load cell includes a retainer for retaining the biasing member on the body.

In one or more embodiments described herein, the biasing member is attached to a body of the load cell.

In one or more embodiments described herein, the body is formed from a cast.

In one or more embodiments described herein, the body is machined after removal from a cast.

While the foregoing is directed to embodiments of the present disclosure, other and further embodiments may be devised without departing from the basic scope thereof, and the scope of the present disclosure is determined by the claims that follow.

The invention claimed is:

1. A load cell for use with a tong assembly, comprising:
a body;
a chamber formed in the body;
a strain gauge disposed in the chamber;
a first eye for pivotal coupling to the tong assembly;
a second eye for pivotal coupling to the tong assembly; and
a biasing member disposed around the second eye for biasing the body relative to the tong assembly.

2. The load cell of claim 1, wherein the biasing member includes a hole in alignment with the second eye.

3. The load cell of claim 2, wherein the biasing member extends beyond the body.

4. The load cell of claim 1, wherein the strain gauge is disposed on a thin wall section of the body.

5. The load cell of claim 1, further comprising an external plug for data communication with the strain gauge.

6. The load cell of claim 5, further comprising a channel formed in the body, the channel extending between the chamber and the plug.

7. The load cell of claim 1, further comprising an electrical board disposed in the chamber and in communication with the strain gauge.

8. The load cell of claim 7, wherein the electrical board is disposed in the chamber along a longitudinal axis of the body.

9. The load cell of claim 1, further comprising a bearing disposed in the second eye.

10. The load cell of claim 1, further comprising a plate enclosing the chamber.

11. The load cell of claim 10, wherein the plate is sealingly and elastically mounted to the body.

12. The load cell of claim 1, further comprising a retainer for retaining the biasing member on the body.

13. The load cell of claim 4, wherein the thin wall section of the body defines a portion of the chamber and is disposed between the first eye and the second eye.

14. The load cell of claim 9, further comprising a bearing retainer for retaining the bearing in the second eye.

15. A tubular handling apparatus, comprising:
a power tong;
a backup tong; and
a load transfer assembly connected between the power tong and the backup tong, wherein the load transfer assembly includes a load cell, the load cell having:
a body;
a chamber formed in the body;
a strain gauge disposed in the chamber;
a first eye for pivotal coupling to power tong;
a second eye for pivotal coupling to backup tong; and
a biasing member disposed around the second eye for biasing the body relative to the backup tong.

16. The tubular handling apparatus of claim 15, further comprising a retainer for retaining the biasing member on the body.

17. The tubular handling apparatus of claim 15, wherein the strain gauge is disposed on a thin wall section of the body.

18. The tubular handling apparatus of claim 15, further comprising a plug for data communication.

19. The tubular handling apparatus of claim 15, further comprising a plate for enclosing the chamber.

20. A method of measuring a torque applied between a first tubular and a second tubular, comprising:
gripping the first tubular using a power tong;
gripping the second tubular using a backup tong;
applying a torque to the first tubular using a power tong;
measuring the torque using a load cell;
bending the load cell relative to the backup tong while measuring the torque; and returning the load cell into alignment with the backup tong using a biasing member, the biasing member disposed around an eye formed at one end of a body of the load cell.

\* \* \* \* \*